UNITED STATES PATENT OFFICE.

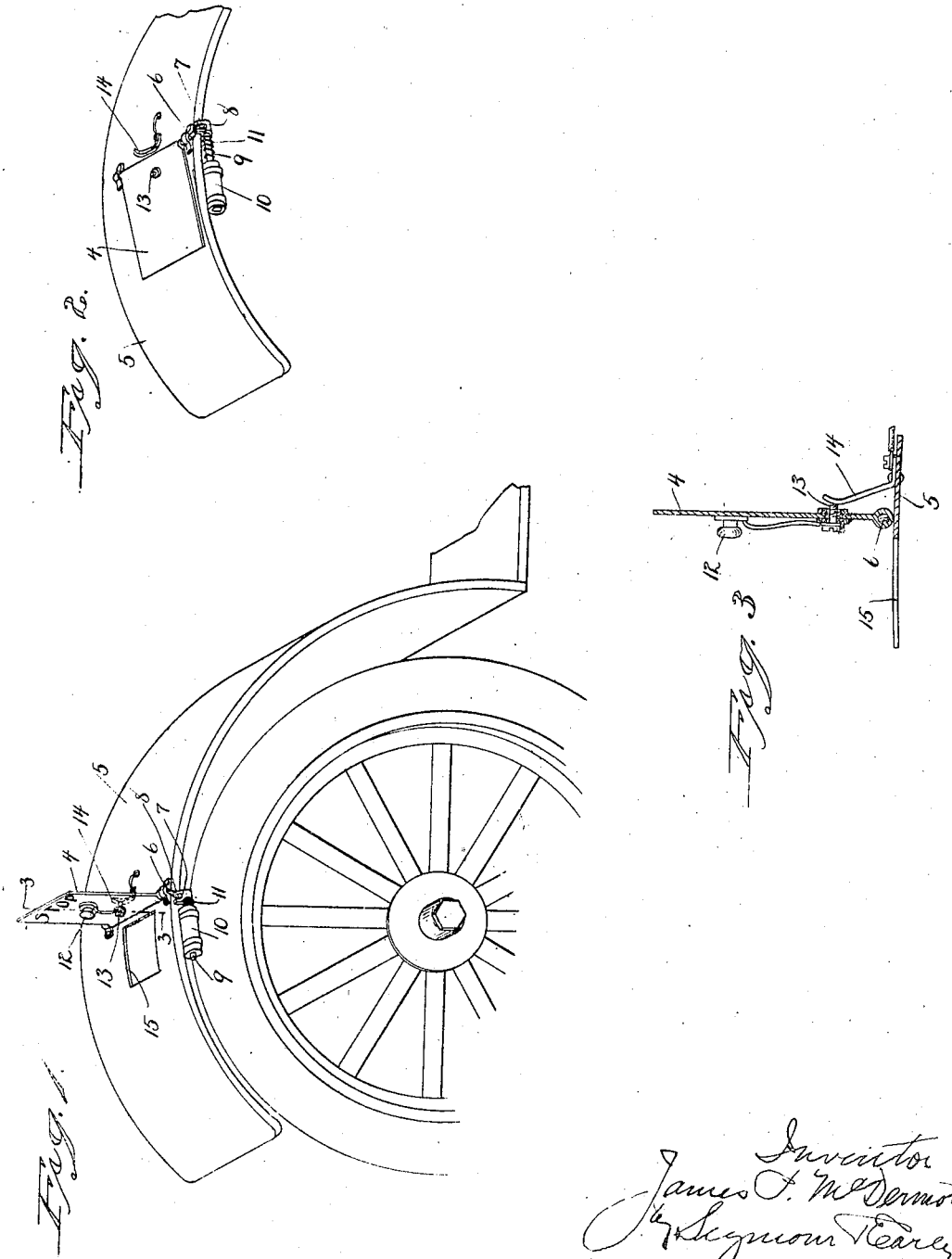

JAMES P. McDERMOTT, OF NEW HAVEN, CONNECTICUT.

AUTOMOBILE-SIGNAL.

1,262,365.

Specification of Letters Patent.

Patented Apr. 9, 1918.

Application filed May 4, 1917. Serial No. 166,461.

*To all whom it may concern:*

Be it known that I, JAMES P. McDERMOTT, a citizen of the United States, residing at New Haven, in the county of New Haven and State of Connecticut, have invented a new and useful Improvement in Automobile-Signals; and I do hereby declare the following, when taken in connection with the accompanying drawings and the characters of reference marked thereon, to be a full, clear, and exact description of the same, and which said drawings constitute part of this application, and represent, in—

Figure 1 a perspective view of a mud-guard for motor vehicles showing my improved signal attached thereto and in the open position.

Fig. 2 a similar view, with the signal in the closed position.

Fig. 3 a sectional view on the line 3—3 of Fig. 2.

This invention relates to an improvement in automobile signals, and particularly to signals adapted to be thrown into visible position when a vehicle is about to stop or to turn a corner, the object being to provide a simple construction adapted to be mounted on the mud-guard of one of the rear wheels so as to be in position to be clearly seen from the rear; and the invention consists in the construction hereinafter described and particularly recited in the claim.

In carrying out my invention, I employ a signal plate 4 hinged to one of the rear mud-guards 5 of a motor vehicle. This plate is connected at its lower end to a shaft 6 provided at its outer end with a crank arm 7 to be engaged by a hook 8 on the end of a bar 9 entering a solenoid magnet 10 into which the bar is drawn by energizing a magnet which may be done from any convenient point, a spring 11 returning the bar when the current is shut off. Mounted in the plate is an incandescent lamp 12 in connection with a pin 13 which may be engaged by an arm 14 when the plate is raised and so as to close a circuit through the lamp, the said arm 14 forming a stop to limit the upward movement of the plate. When the vehicle is about to stop or turn a corner, the magnet 10 will be energized to raise the plate, and as the plate rises the circuit is closed through the lamp so that a light will be seen by anyone approaching from the rear. The mud-guard may be recessed or formed with an opening 15 providing clearance for the lamp when the plate is in the closed position.

I claim:—

The combination with the mud-guard of a motor vehicle, said guard formed in its upper face with an opening, a shaft mounted on the guard adjacent the forward edge of said opening, a signal plate fixed to said shaft, means for moving said shaft to turn the signal plate from a horizontal to a vertical position, and vice versa, and an incandescent lamp mounted on said plate and adapted when the plate is turned down to enter the opening in the mud-guard.

In testimony whereof, I have signed this specification in the presence of two subscribing witnesses.

JAMES P. McDERMOTT.

Witnesses:
MICHAEL J. MURRAY,
GEORGE HAROLD PFEIL.